United States Patent
Amada et al.

(10) Patent No.: US 7,680,287 B2
(45) Date of Patent: Mar. 16, 2010

(54) DIRECTIONAL SETTING APPARATUS, DIRECTIONAL SETTING SYSTEM, DIRECTIONAL SETTING METHOD AND DIRECTIONAL SETTING PROGRAM

(75) Inventors: Tadashi Amada, Kanagawa-Ken (JP); Takumi Yamamoto, Kanagawa-Ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 969 days.

(21) Appl. No.: 10/662,294

(22) Filed: Sep. 16, 2003

(65) Prior Publication Data

US 2004/0066941 A1 Apr. 8, 2004

(30) Foreign Application Priority Data

Sep. 17, 2002 (JP) ............................. 2002-270318

(51) Int. Cl.
*H04R 3/00* (2006.01)
(52) U.S. Cl. ........................................ 381/92; 704/275
(58) Field of Classification Search ................... 381/92, 381/98, 91, 356, 122, 111, 110, 26; 704/200, 704/275, 231, 270, 272; 379/406.01–406.03
See application file for complete search history.

(56) References Cited

U.S. PATENT DOCUMENTS

| | | | | |
|---|---|---|---|---|
| 5,737,431 A | * | 4/1998 | Brandstein et al. | 381/92 |
| 5,778,082 A | * | 7/1998 | Chu et al. | 381/92 |
| 6,469,732 B1 | * | 10/2002 | Chang et al. | 348/14.08 |
| 6,748,088 B1 | * | 6/2004 | Schaaf | 381/92 |
| 6,804,396 B2 | * | 10/2004 | Higaki et al. | 382/181 |
| 6,931,596 B2 | * | 8/2005 | Gutta et al. | 715/728 |
| 2002/0001389 A1 | | 1/2002 | Amiri et al. | |
| 2003/0063759 A1 | * | 4/2003 | Brennan et al. | 381/92 |
| 2003/0177012 A1 | * | 9/2003 | Drennan | 704/275 |

FOREIGN PATENT DOCUMENTS

| | | |
|---|---|---|
| JP | 10-207490 | 8/1998 |
| JP | 2000-181498 | 6/2000 |
| JP | 2001-296891 | * 10/2001 |

(Continued)

OTHER PUBLICATIONS

Nagai et al., "Estimation of Source Location Based on 2-D Music and Its Application to Speech Recognition in Cars," IEEE International Conference on Acoustics, Speech, and Signal Processing Proceedings (May 7-11, 2001), pp. 3041-3044.

(Continued)

*Primary Examiner*—Vivian Chin
*Assistant Examiner*—Lun-See Lao
(74) *Attorney, Agent, or Firm*—Finnegan, Henderson, Farabow, Garrett & Dunner, L.L.P.

(57) ABSTRACT

A directional setting apparatus according to the present invention, comprising: a voice recognition unit which detects a certain voice included in a sound signal outputted from a microphone array having a plurality of microphones and a directional determination period indicating a detection period of said certain voice; a voice direction detector which detects occurrence direction of said certain voice in said directional determination period; and a directional controller which controls directivity of a prescribed apparatus based on the sound signals outputted from said plurality of microphones in said directional determination period.

4 Claims, 8 Drawing Sheets

FOREIGN PATENT DOCUMENTS

JP        2002-034092       1/2002

OTHER PUBLICATIONS

Lleida et al., "Robust Continuous Speech Recognition System Based on a Microphone Array," Proceedings of the 1998 IEEE International Conference (May 12, 1998), pp. 241-244.

Kiyohara et al., "A Microphone Array System for Speech Recognition," IEEE International Conference (Apr. 21, 1997), pp. 215-218.

Jurou Oga, "Acoustic Systems and Digital Processing", pp. 180-191(1995).

Notification of Reason for Rejection issued by the Japanese Patent Office, mailed Feb. 7, 2006, for Japanese Patent Application No. 270318/2002, and English-language translation thereof.

\* cited by examiner

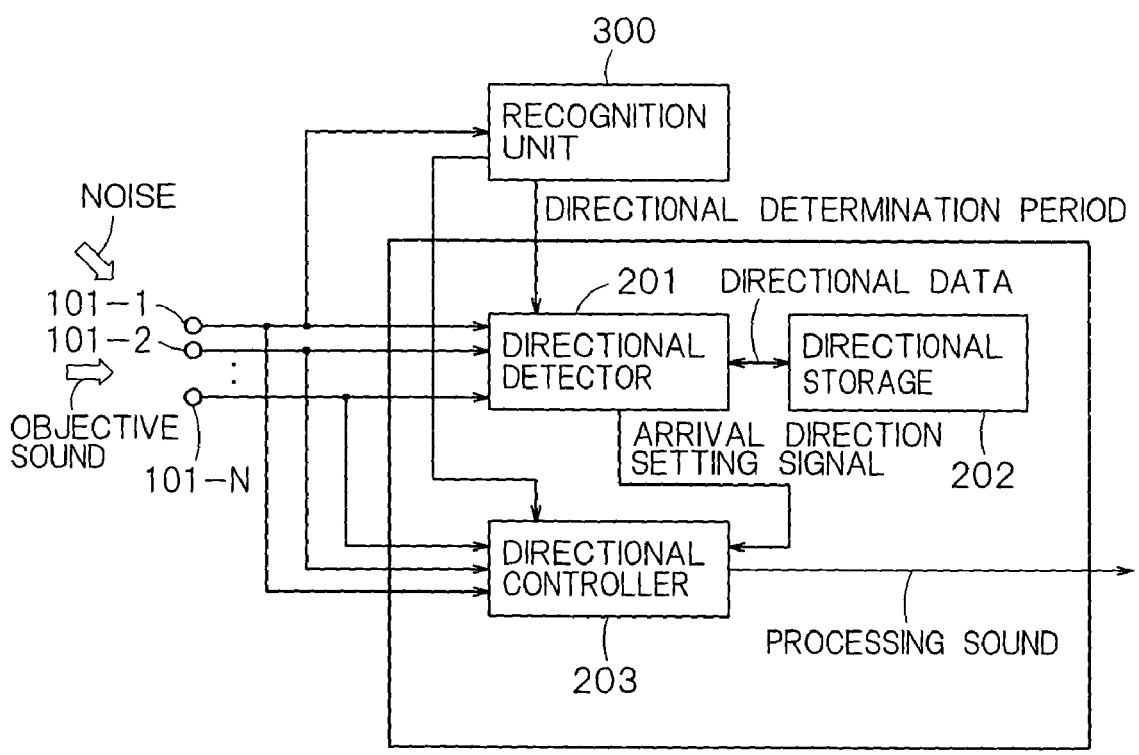
F I G. 1

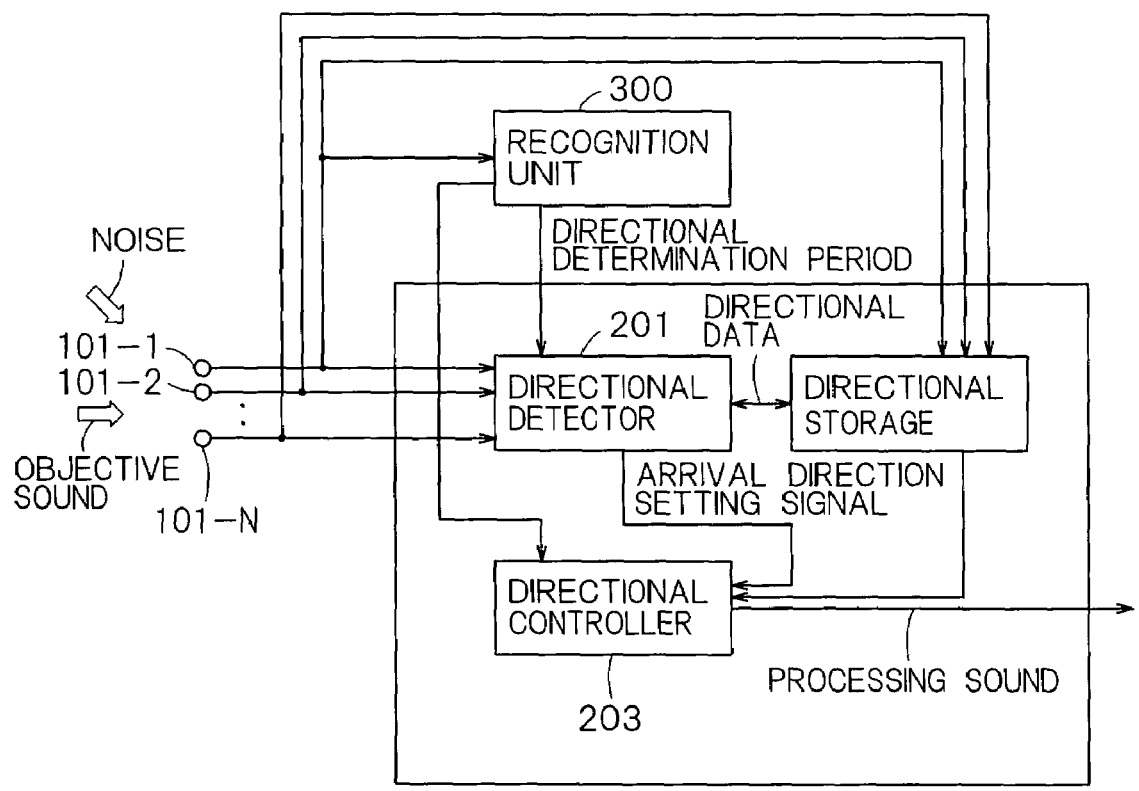
F I G. 2

DIRECTIONAL SETTING APPARATUS, DIRECTIONAL SETTING SYSTEM, DIRECTIONAL SETTING METHOD AND DIRECTIONAL SETTING PROGRAM

CROSS REFERENCE TO RELATED APPLICATIONS

This application claims benefit of priority under 35USC §119 to Japanese Patent Application No. 2002-270318, filed on Sep. 17, 2002, the entire contents of which are incorporated by reference herein.

BACKGROUND OF THE INVENTION

1. Field of the Invention

The present invention relates to a directional setting apparatus, a directional setting system, a directional setting method and a directional setting program which form directivity of equipments by using a microphone consisted of a plurality of microphones.

2. Related Background Art

Recently, with performance improvement of voice recognition techniques, a voice recognition engine has been actively put into practical use in real circumstances. Especially, in situations where an input apparatuses are limited, i.e. a car navigation system and a mobile apparatus, expectation for voice recognition is high.

In voice recognition processing, an input sound imported from a microphone is compared with a recognition objective vocabulary in order to obtain a voice recognition result. Under real circumstances, because there are various noise sources, ambient noises are included in the sound signal imported by the microphone. In the voice recognition processing, anti-noise performance has large influence on recognition accuracy. For example, assuming the case where the voice recognition is carried out in a car, there are a lot of noises in the car, for example, engine sound of the car, wind sound, sound of an opposite car, sound of passing car and sound of a car stereo. These noises are inputted to a voice recognition apparatus while being mixed in a voice of a speaking person, and degradation of a recognition rate is caused.

As a method of solving a problem of such a noise, a microphone array technique for suppressing noises by using a plurality of microphones is known. In the microphone array technique, signal processings are performed for a sound inputted from a plurality of microphones. Therefore, a sharp directivity is formed in a direction of an objective sound, and an objective sound is emphasized by lowering sensitivity of the other direction.

For example, in the case of a delay sum type of microphone array (delay sum array) described in seventh chapter of "Sound System and Digital processings" (The Institute of Electronics, Information and Communication Engineers, 1995), an output signal Se(t) of the delay sum array is obtained by adding signals Sn(t) (n=1, ... N) while shifting by a time difference τ depending on the direction of arrival of the objective sound. That is, the emphasized sound signal Se(t) is obtained by the following equation (1).

$$Se(t) = \sum_{n=1}^{N} Sn(t + n\tau) \quad (1)$$

Here, a plurality of microphones are arranged in sequence of suffixes n at even intervals.

The delay sum array forms directivity in a direction of the objective sound by using a phase difference of an incoming signal. That is, the delay sum array sets a delay time for the input signal of the microphones taking into consideration a time difference τ by when the incoming signal reaches the microphones. After a phase of sound signals (including an objective signal) from the direction of arrival of the objective sound by delay processings for the signals is set in-phase, the objective signal is emphasized by mutually adding them. On the other hand, with regard to the noise incoming from a direction different from the objective signal, the phases are mutually shifted by the delay processings, and the noise components are weakened to each other.

In such a delay sum array, how to estimate the time difference τ corresponding to the direction of arrival (DOA) of the objective sound is important. If the estimation of τ is mistaken, the phase between the objective sounds after delay is shifted, the objective sound by itself is suppressed, and deterioration of performance occurs.

Thus, in a technique of suppressing noise by using directivity of the microphone, estimation of DOA is extremely important. With regard to estimation of the DOA, research is actively being carried out. As disclosed in the above-mentioned document, various methods such as a linear predictive method, a minimum distribution method and an MUSIC method are proposed.

For example, Japanese Patent Publication Laid-Open No. 9794/1997 discloses a method in which direction of the speaking person is sequentially detected by the microphone, the direction of the speaking person is tracked by updating the directivity of the microphone depending on the direction of the speaking person, thereby suppressing distortion for the objective signal.

However, for example, in the case where a plurality of persons utter, the direction of the speaking person is not necessarily the direction of arrival of the objective sound. For example, only a certain person among a plurality of persons utters the objective sound, and utterance of the other persons may be noise. In this case, the direction of arrival (DOA) of the objective sound has to be set to only a direction of the certain person of a plurality of persons.

In order to ensure the estimation of the DOA, Japanese Patent Publication Laid-Open No. 9794/1997 discloses a method of setting a sound source area in advance, and registering it by association with the keyword. In this document, locations of the speaking persons for the microphone array are registered with the keyword. When the keyword is acknowledged from the input voice, the table in which the locations of the speaking persons and the keywords are registered is referred. The sound source area corresponding to the acknowledged keyword is identified. Hereinafter, a sharp directivity is set to this sound source area. Therefore, it becomes possible to detect a sure DOA, and improve a voice recognition accuracy.

Although a method of Japanese Patent Publication Laid-Open 9794/1997 is effective as a method of surely setting the DOA, the DOA capable of setting, that is, locations of the speaking persons are fixed in advance. There is a problem in which the location of a fixed speaking person has to be registered and recorded with the keyword.

SUMMARY OF THE INVENTION

An object of the present invention is to provide a directional setting apparatus, a directional setting system, a directional setting method and a directional setting program capable of arbitrarily setting a direction of directivity and surely setting a directivity to a direction of arrival of the objective sound, without storing the direction of the directivity.

In order to achieve the foregoing object, a directional setting apparatus, comprising:

a voice recognition unit which detects a certain voice included in a sound signal inputted from a microphone array having a plurality of microphones and a directional determination period indicating a detection period of said certain voice;

a voice direction detector which detects occurrence direction of said certain voice in said directional determination period; and a directional controller which controls directivity of a prescribed apparatus based on the sound signals outputted from said plurality of microphones in said directional determination period.

BRIEF DESCRIPTION OF THE DRAWINGS

FIG. 1 is a block diagram showing a directional setting apparatus of a first embodiment according to the present invention.

FIG. 2 is a block diagram showing an example of the entire configuration of a directional setting apparatus when the directional storage stores waveform data of an input sound signal by itself.

DESCRIPTION OF THE PREFERRED EMBODIMENTS

Figure 3:
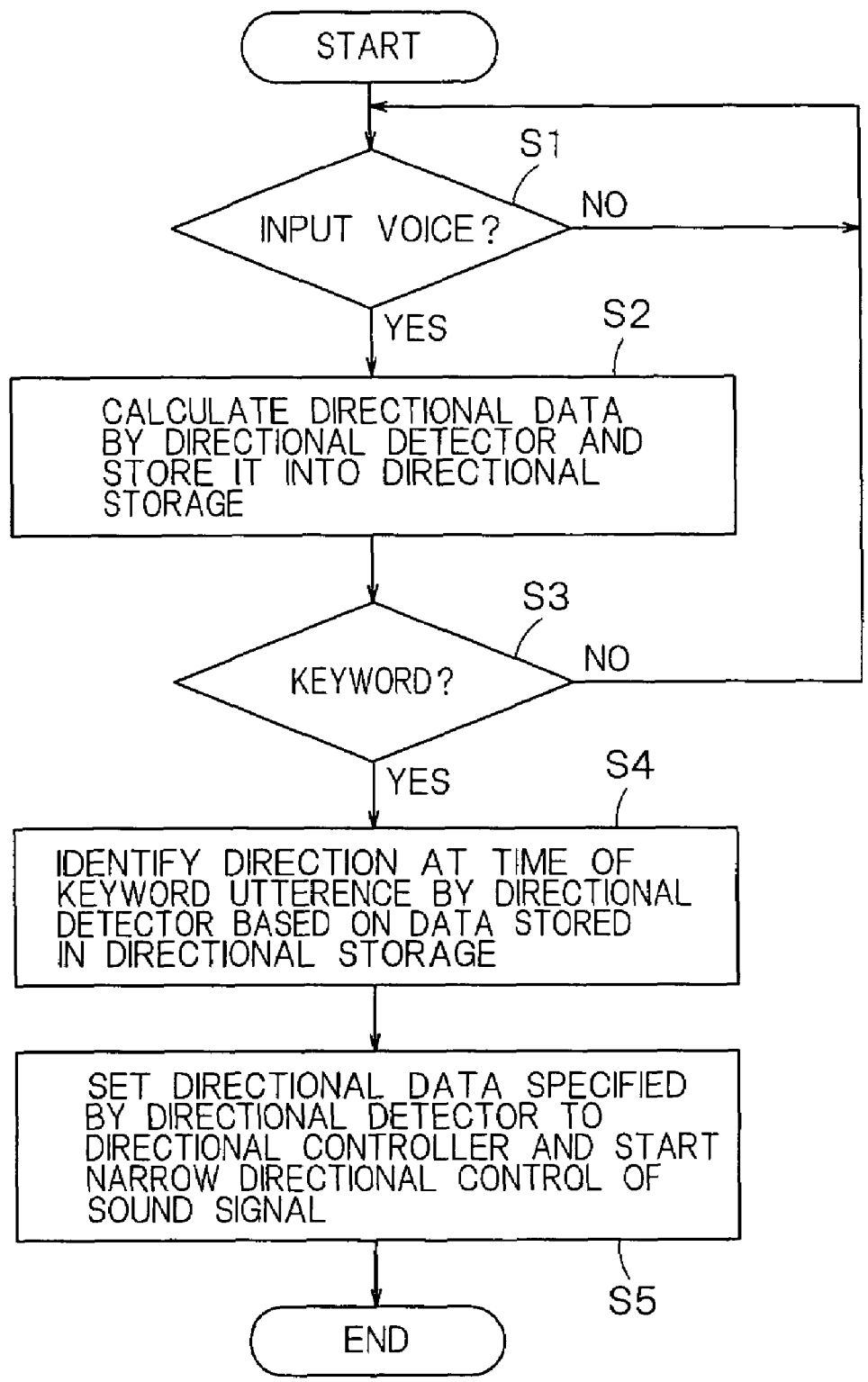
FIG. 3 is a flowchart for explaining operation of a first embodiment.

Hereinafter, with reference to drawings, embodiments according to the present invention will be described in detail.

First Embodiment

FIG. 1 is a block diagram showing a directional setting apparatus of a first embodiment according to the present invention. FIG. 1 shows an example in which the present invention is applicable to the directional setting apparatus for a noise suppression using a microphone array. The directional setting apparatus of FIG. 1 sets a certain keyword indicating a start of utterance, estimates a DOA of keyword at it is by voice recognition of the keyword, and forms a directivity for a certain period. Therefore, among a plurality of persons capable of uttering, only a voice of a certain person uttering the keyword is emphasized, and a sound processing for suppressing noise of the other direction of arrival can be performed. That is, without limiting an uttered location and user, even if unspecified number of persons has uttered from arbitrary locations, it is possible to surely detect the DOA.

The directional setting apparatus of FIG. 1 has a plurality of microphones 101_1-101_N, a recognition unit 300, a directional detector 201, a directional storage 202 and a directional controller 203.

A plurality of microphones 101_1-101_N are arranged to locations separated by every prescribed interval, and constitute a microphone array which imports a sound signal. The sound signal imported to the microphones 101_1-101_N is supplied to the directional detector 201 and the directional controller 203. The sound signal from one microphone (the microphone 101_1 in the example of FIG. 1) among a plurality of microphones 101_1-101_N is supplied to the recognition unit 300.

The recognition unit 300 can perform voice recognition processing for the input sound signal, and can detect that sound of a prescribed keyword set in advance has been inputted via the microphone 101_1. When the recognition unit 300 detects sound input of the keyword, the detected result is outputted to the directional detector 201 or the directional controller 203.

For example, the recognition unit 300 carries out sound analysis for every constant time interval (frame), and obtains time sequence of voice characterizing amount such as cepstrum and power spectrum and a start time and a end time of voice, as a analyzed result. The recognition unit 300 has a keyword storage not shown in which a prescribed keyword is registered. The recognition unit 300 performs a pattern matching between the characterizing amount of the analyzed result and patterns of the characterizing amount of words registered in the keyword storage, in order to determine whether both coincides with each other.

The recognition unit 300 can output a frame corresponding to the keyword, i.e. a signal indicating the uttered period as the directional determination period to the directional detector 201. The recognition unit 300 can specify only a period in which the input sound level is not less than a prescribed level, among the uttered period of the keyword, as the directional determination period. The recognition unit 300 may specify a period longer or shorter than the uttered period of the keyword by a prescribed period, as the directional determination period.

A keyword indicating a start of utterance, a keyword indicating an end of utterance are registered and so on as a prescribed keyword. The recognition unit 300 outputs the directional determination period to the directional detector 201 when the keyword indicating a start of utterance is detected, and outputs the detection result (a directional release signal) when the keyword indicating an end of utterance is detected, to the directional controller 203.

The directional detector 201 sequentially detects the direction of arrival of the input sound from the sound signal inputted to a plurality of microphones 101_1-101_N., and outputs directional data indicating the direction of arrival of the input sound. For example, the directional detector 201 detects the direction of arrival of the input sound for each frame, and sequentially outputs the detection result to the directional storage 202.

The directional storage 202 sequentially stores directional data indicating the direction of arrival of the input sound. The directional storage 202 has a storage capacity which stores directional data for a period longer than at least the directional determination period.

The directional detector 201 outputs and stores the directional data to the directional storage 202, and can read out the directional data stored in the directional storage 202. The directional detector 201 reads out one or more directional data within a period corresponding to the directional determination period from the directional storage 202, and detects the direction of arrival of the input sound in the directional determination period, for example, by an average value processing or most preferred processing using the read-out directional data, when the signal indicating the directional determination period from the recognition unit 300 is given. That is, the directional detector 201 detects the direction from the microphone array for the utterer of the keyword.

The directional detector 201 outputs the calculation result of the direction of arrival of the input sound in the directional determination period as the arrival direction setting signal.

The sound signal from a plurality of microphones 101_1-101_N is inputted to the directional controller 203. The directional controller 203 sets directional property of the inputted sound signal based on the arrival direction setting signal from the directional detector 201.

For example, the directional controller 203 delays the sound signal from the microphones 101_1-101_N based on the amount of delay based on the direction of arrival specified by locations of the microphones 101_1-101_N and the arrival direction setting signal, and obtains the sound signal which adds the delay signals and has narrow directivity in a desirable direction. That is, a processing sound that sensitivity in the direction of arrival of the objective sound is eminently high, and sensitivity of the other directions is eminently low, is outputted.

The directional controller 203 stops the directional control processing and returns the directivity to wide directivity (non-directivity), when the signal informing detection of the keyword indicating the end of utterance (a directional release signal) is given from the recognition unit 300, the directional control processing is stopped, and the directivity is returned to the wide directivity (non-directivity). Although the directional controller 203 has ended the directional control processing by the detection result of the keyword indicating the end of utterance, the directional control processing may be automatically ended after a prescribed period set in advance from the start of utterance.

In the above-mentioned explanation, the directional storage 202 stores the sequentially inputted directional data. The directional detector 201 may store data capable of calculating the direction of arrival of the input sound in the directional determination period. For example, wave data by itself of the arrived sound signal may be stored in the directional storage 202.

FIG. 2 is a block diagram showing one example of the entire configuration of the directional setting apparatus in the case of storing the waveform data of the input sound signal as it is. The directional detector 201 of FIG. 2 reads out the waveform data from the directional storage 202, and detects the direction of arrival of the input sound in the directional determination period, immediately after the directional determination period is indicated.

Next, operation of such an embodiment will be described with reference to a flowchart of FIG. 3.

Now, for example, it is assumed that a plurality of utterers at arbitrary locations different from each other use an application using one voice recognition apparatus. In this case, the voices from a plurality of utterers are imported from the microphones 101_1-101_N of the directional setting apparatus of FIG. 1, and a processing sound from the directional controller 203 is supplied to the voice recognition apparatus.

Step S1 of FIG. 3 indicates a waiting status of the voice input. The microphones 101_1-101_N import the sound input, and supply the sound input to the directional detector 201. The sound input imported via the microphone 101_1 is supplied to the recognition unit 300. The sound signal including noise besides the objective sound is inputted to the microphones 101_1-101_N. In the case where a plurality of utterers utter at the same time, the sounds from the utterers except for a certain person become noise.

The directional detector 201 sequentially detects the direction of arrival with regard to the input sound. The direction of arrival of the input sound detected by the directional detector 201 is sequentially supplied to and stored in the directional storage 202 as the directional data (step S2). In this case, the direction of arrival of the objective sound including noise is detected.

On the other hand, the recognition unit 300 recognizes the keyword indicating the start of utterance from the sound signal inputted from the microphone 101_1. For example, it is assumed that a phrase "start" is set as a keyword indicating the start of utterance.

Here, it is assumed that a prescribed utterer among the entire utterers utters the phrase "start". The voice is imported via the microphone 101_1 and supplied to the recognition unit 300. The recognition unit 300 detects that the phrase "start" has been uttered, by a prescribed voice recognition processing for the sound inputted sequentially. The directional detector 201 sets the directional determination period corresponding to the uttered period of the phrase "start" and outputs a signal indicating the period to the directional detector 201.

The directional detector 201 reads out from the directional storage 202 the directional data of a period corresponding to the directional determination period when the signal indicating the directional determination period is inputted. For example, the directional detector 201 determines the direction of arrival of the input sound (objective sound) in the directional determination period, that is, the direction of a prescribed utterer (hereinafter, called as a certain utterer) (step S4). The directional detector 201 outputs the arrival direction setting signal indicating the direction of arrival of the keyword to the directional controller 203.

The directional controller 203 sets the directional property for the sound signal inputted via the microphones 101_1-101_N, based on the arrival direction setting signal. Therefore, hereinafter, the directional controller 203 outputs the processing sound obtained by adding to the input sound, the directional property having narrow directivity and high sensitivity to a direction of a certain utterer (direction of arrival) uttering the keyword (step S5).

Accordingly, for example, when a certain utterer among a plurality of utterers utters "start", and the phrase "start" is recognized as a keyword in the recognition unit 300, hereinafter, even if the other utterer in a direction except for the certain utterer utters, only utterance of the certain utterer is emphasized and supplied to the voice recognition apparatus as the processing sound. Therefore, hereinafter, it is possible to eminently improve the voice recognition accuracy of the certain utterer.

Here, it is assumed that as the keyword indicating the end of utterance, for example, the phrase "end" is set. When the sound of the phrase "end" is inputted to the recognition unit 300 via the microphone 101_1, the recognition unit 300 recognizes the phrase "end" as the keyword. The recognition unit 300 outputs the directional release signal for indicating the end of the directional control processing to the directional controller 203. Therefore, the directional controller 203 ends addition of the directional property for the input sound.

Thus, according to the first embodiment, by indicating the start of utterance by one keyword unrelated to the number of the uttered phrases or the location of the utterer, the direction of the utterer of the keyword is detected by the uttered keyword. Therefore, hereinafter, the processing sound setting the directional property having narrow directivity to the direction of a certain utterer of the keyword is generated. Accordingly, the location of the utterer capable of forming the directivity is not fixed. It is unnecessary to register the location of the utterer in advance. The location of the utterer and the number of the utterers are not limited. Once the keyword of the start of utterance is uttered, and the keyword is acknowledged, it is possible to emphasize the sound from the direction of a certain utterer surely during a prescribed period or until when the keyword of the end of utterance is uttered, thereby eminently improving the voice recognition accuracy of voices uttered by a certain utterer.

Second Embodiment

Figure 4:
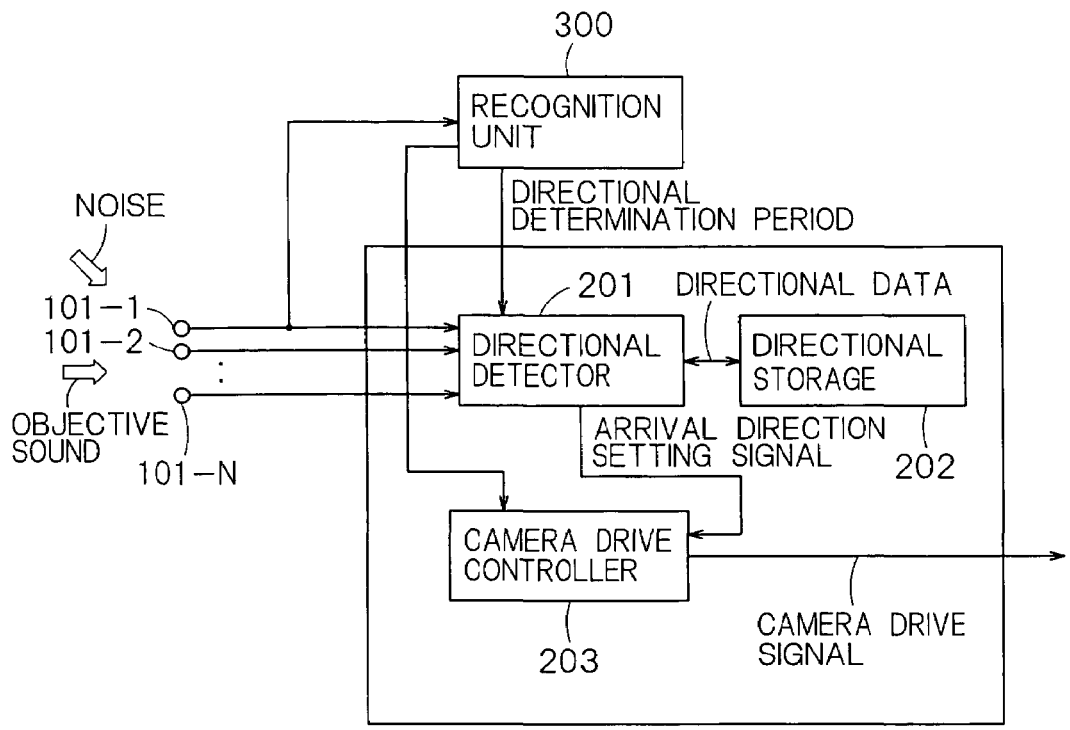
FIG. 4 is a block diagram showing a directional setting apparatus of a second embodiment according to the present invention.

FIG. 4 is a block diagram showing a directional setting apparatus of a second embodiment according to the present invention. In FIG. 4, the same reference numbers are attached to the same constituents, and explanation will be omitted.

In the second embodiment, the direction of a field of view of a camera is controlled by the direction of arrival of the keywords. The second embodiment is different from the first embodiment in which a camera drive controller 211 is provided, instead of the directional controller 203.

In the second embodiment, a camera capable of picking up images in the directions of a plurality of utterers is arranged on a support table not shown. The support table can arbitrarily change an angle in horizontal and vertical directions by the drive unit not shown. The camera drive controller 211 can control the horizontal and vertical directions of the camera support table by outputting the camera drive signal to the drive unit.

The camera drive controller 211 of the second embodiment outputs the camera drive signal which controls the direction of the camera support table based on the direction of arrival from the directional detector 201. Therefore, the camera can pick up images in the direction of arrival of the objective sound. That is, the camera drive controller 211 carries out the directional control processing which sets the view direction of the camera to a certain utterer according to keyword utterance of the certain utterer.

The directional controller 203 stops the directional control processing and returns the view direction of the camera to a prescribed initial direction when it receives the signal indicating detection of the keyword indicating the end of utterance (directional release) from the recognition unit 300. Although the directional controller 203 may finish the directional control processing which sets the view direction of the camera to the direction of the certain utterer according to the detection result of the keyword indicating the end of utterance, the directional control processing may be automatically ended after a prescribed period set in advance from the start of utterance, and the view direction of the camera may be returned to a prescribed initial direction.

In the second embodiment, a prescribed utterer (a certain utterer) in all the utterers utters the keyword indicating the start of utterance (directional setting), and utterance of the keyword is detected by the recognition unit 300. Afterward, during a prescribed period or until when the keyword of the end of utterance (directional release) is recognized, the view direction of the camera is automatically set to a certain utterer, and it is possible to pick up images of a certain utterer.

Although the camera drive controller 211 of the second embodiment sets the view direction of the camera to a certain utterer, it is possible to set the view direction to a prescribed direction for the direction of a certain utterer.

It is apparent that the directivity having narrow directivity to a direction of a certain utterer with regard to the input sound from the microphones 101_1-101_N is formed, and at the same time, the camera can pick up images of the direction of a certain utterer, by combining the first and second embodiments.

Third Embodiment

Figure 5:
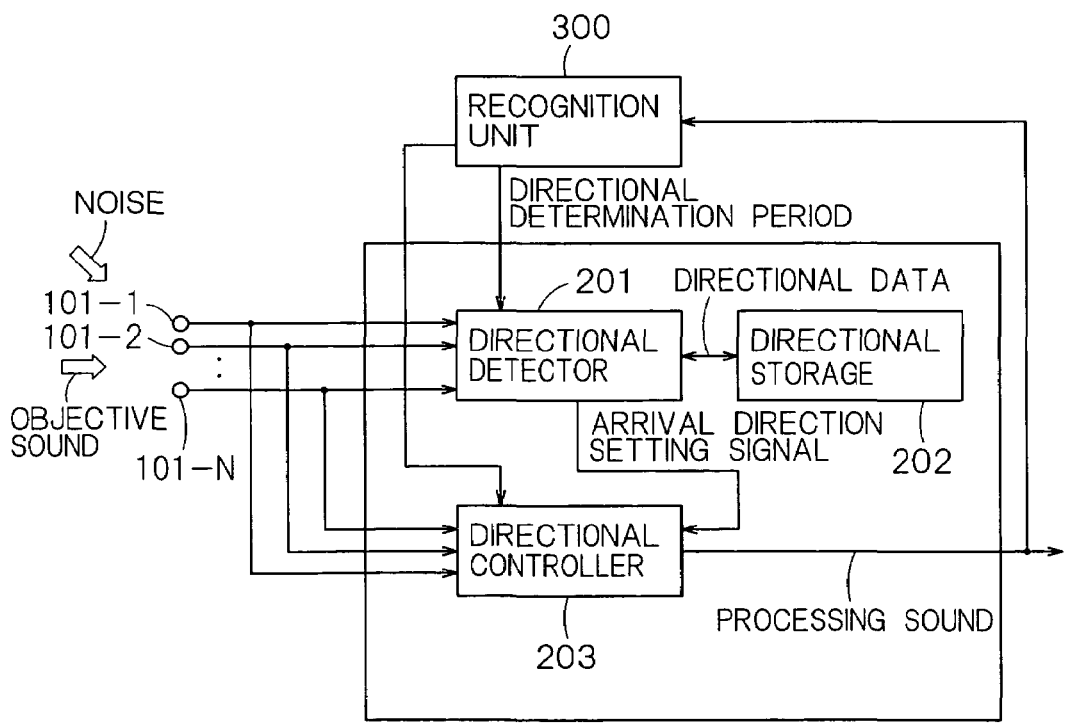
FIG. 5 is a block diagram showing a directional setting apparatus of a third embodiment according to the present invention.

FIG. 5 is a block diagram showing a directional setting apparatus of a third embodiment according to the present invention. In FIG. 5, the same reference numbers are attached to the same constituents as those of FIG. 1, and explanations will be omitted.

The third embodiment has characteristics different from that of the first embodiment, in which a processing sound from the directional controller 203 is supplied to the recognition unit 300.

In the third embodiment, for example, the directional controller 203 sets an initial status to a wide directivity or non-directivity. Therefore, the input sounds from the microphones 101_1-101_N are simply combined and supplied to the recognition unit 300.

Thus, according to the third embodiment, detection processing of the keyword is performed with regard to the input sound from the microphone with the microphones 101_1-101_N, thereby improving accuracy of the detection result of the keyword.

In the initial status, it is possible to set the directivity of the directional controller 203 to a prescribed direction. In this case, it is possible to limit the utterer capable of detecting the keyword, i.e. a certain utterer.

In the first embodiment, only a sound from the microphone 101_1 is supplied to the recognition unit 300. Because of this, even if when the utterer locating the directions except for the direction of a certain utterer utters the keyword indicating the end of utterance, the directional control processing by the directional controller 203 is ended. On the other hand, according to the third embodiment, because the processing sound from the directional controller 203 is supplied to the recognition unit 300, if once a certain utterer is determined, hereinafter, only when a certain utterer or the utterer locating the direction of a certain utterer has uttered the keyword "end", the keyword can be acknowledged, and the directional control processing can be ended. Therefore, it is possible to reduce possibility of malfunction of the application using the voice recognition apparatus.

Fourth Embodiment

Figure 6:
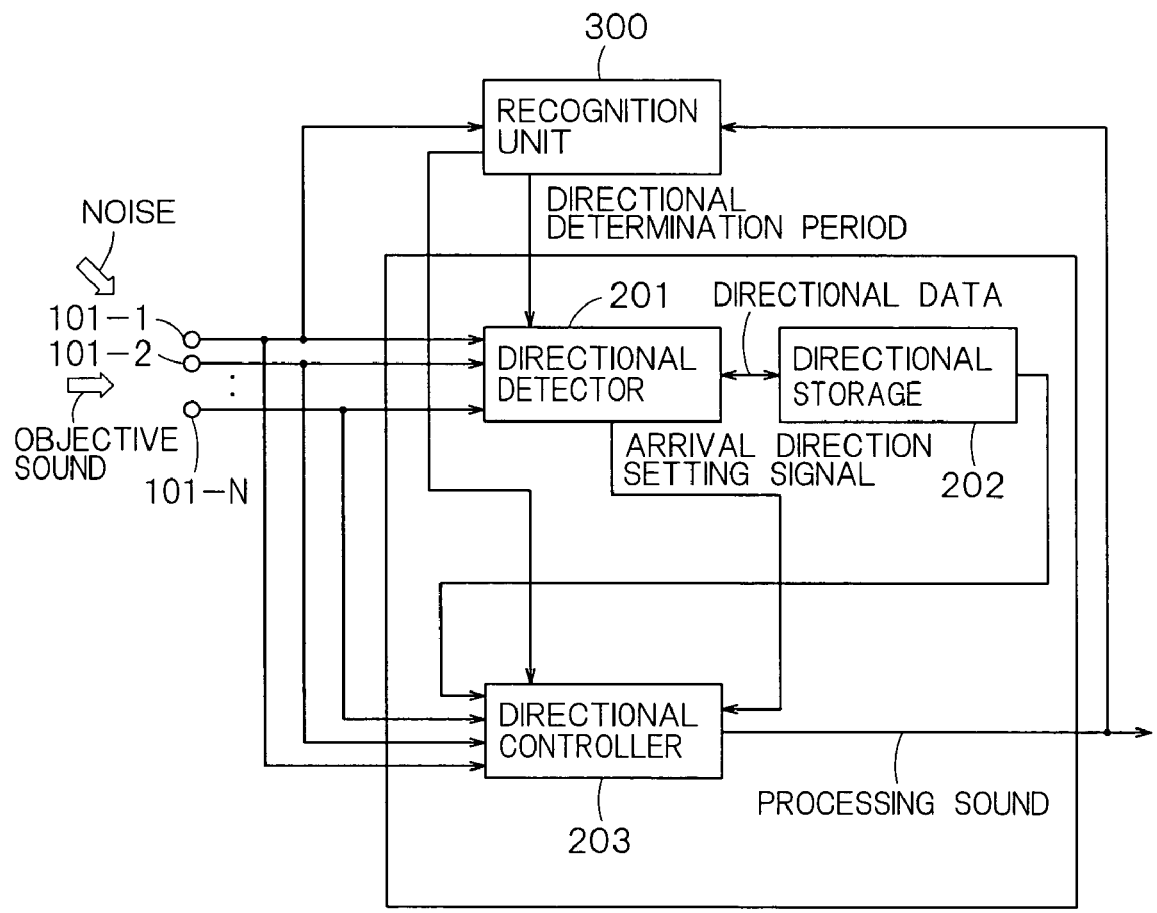
FIG. 6 is a block diagram showing a directional setting apparatus of a fourth embodiment according to the present invention.

FIG. 6 is a block diagram showing a directional setting apparatus of a fourth embodiment according to the present invention. In FIG. 6, the same reference numbers are attached to the same constituents, and explanation will be omitted.

In the present embodiment, detection accuracy is improved by carrying out a plurality of times the detection of the direction of arrival of the objective sound. The directional detector 205 sequentially detects the direction of arrival of the input sound from the sound signal inputted to a plurality of microphones 101_1-101_N, and directional data indicating the direction of arrival of the input sound can be stored in the directional storage 202, similarly to the directional detector 201 in FIG. 1.

Furthermore, the directional detector 205 of the fourth embodiment can read out the directional data of a period different from the directional determination period from the recognition unit 300 from the directional storage 202, and revise the arrival direction setting signal.

The directional detector 205 of the fourth embodiment can supply and store the input sound by itself from the microphones 101_1-101_N to the directional storage 202. In this case, the directional detector 205 reads out the waveform data stored in the directional storage 202 at a second calculation time of the direction of arrival, and the detection calculation in the direction of arrival is again carried out. At third or more calculation times of direction of arrival, the directional detector 205 carries out calculation with accuracy higher than the calculation of the direction of arrival at first time.

The directional storage 202 supplies the held data to the directional controller 203. The directional controller 203 supplies the processing sound forming the directivity for data from the directional storage 202 to the recognition unit 300 at second or more calculation times of the direction of arrival. Therefore, it is possible to obtain the information of the result of voice recognition which is used as a reference at calculation time of the direction of arrival even at second or more calculation times of the direction of arrival.

The first calculation time of the direction of arrival has to largely set the directional range to be detected as the direction of arrival of the objective sound. Accordingly, the calculation of the direction of arrival by the directional detector 205 is carried out at comparatively rough accuracy. On the other hand, at second or more calculation times of the direction of arrival, the directional range to be detected on some level is limited by first calculation time of the direction of arrival. Because of this, it is possible to carry out the calculation at comparatively high accuracy. Thus, the directional detector 205 can detect the direction of arrival at higher accuracy by carrying out a plurality of times the calculation of the direction of arrival.

Next, operations of the embodiment having the above-mentioned configurations will be described.

The recognition unit 300 detects the keyword by using the input sound from the microphone 101_1. When the recognition unit 300 detects the keyword, it sets the directional determination period based on the uttered period, and performs indication for the directional detector 205. The directional detector 205 calculates the direction of arrival of the objective sound from the directional data or the waveform data stored in the directional storage 202, depending on the indication of the directional determination period from the recognition unit 300. The directional detector 205 outputs the arrival direction setting signal indicating the detected direction of arrival, to the directional controller 203. Therefore, the directional controller 203 outputs the processing sound having the directivity to the certain utterer of the keyword.

The directional detector 205 of the fourth embodiment can carry out a plurality of times the calculation of the direction of arrival by using the directional data or the waveform data stored in the directional storage 202. For example, in vicinity of start time and end time of the uttered period of the keyword, even if noise level is high, the operation for controlling directivity and the operation for recognizing the signal obtained by the directivity are repeated, the noise is removed, and only a sound is extracted. Because of this, an uttered period more accurate than that of the keyword is obtained, and the calculation of the direction of arrival is not influenced on the noise uttered before and after the keyword, thereby improving accuracy of the calculation of the direction of arrival.

The directional detector 205 reads out the waveform data stored in the directional storage 202, and calculates the direction of arrival with regard to the comparatively narrow direction range in vicinity of the direction of arrival detected at first calculation time of the direction of arrival. Therefore, it is possible to improve the accuracy of the calculation of the direction of arrival.

The directional detector 205 reads out the waveform data stored in the directional storage 202, and calculates the direction of arrival with regard to a comparatively narrow directional range in vicinity of the direction of arrival detected at a first calculation time of the direction of arrival. Therefore, it is possible to improve the accuracy of the calculation of the direction of arrival.

The directional detector 205 outputs the arrival direction setting signal indicating the direction of arrival detected by a plurality of times calculation of the direction of arrival. Therefore, the directivity controller 203 can set a narrow directivity at even high accuracy as the direction of arrival of the objective sound.

Thus, according to the fourth embodiment, the calculation of the direction of arrival at second or more times is carried out by using the calculation result of the calculation of the direction of arrival at first time. Therefore, it is possible to detect the direction of arrival at further high accuracy.

According to the fourth embodiment, in the calculation of the direction of arrival at second or more times, the calculation using data in the directional storage 202, i.e. the calculation using the keyword is performed. On the other hand, the calculation of the direction of arrival at second or more times may be performed based on the sound signal that the utterer has uttered newly. In this case, although it is unnecessary to store data in the directional storage 202, the recognition unit 300 needs a voice recognition except for the keyword.

Fifth Embodiment

Figure 7:
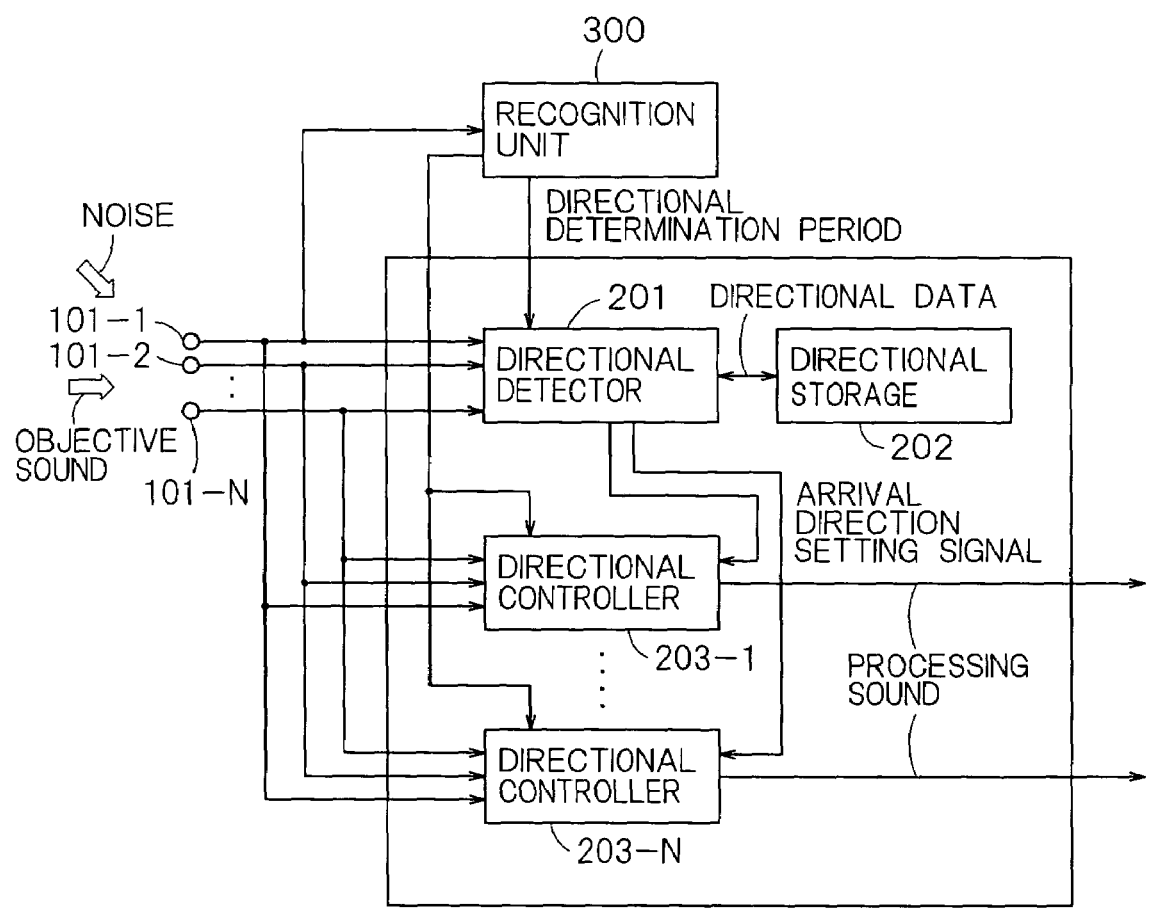
FIG. 7 is a block diagram showing a directional setting apparatus of a fifth embodiment according to the present invention.

FIG. 7 is a block diagram showing a directional setting apparatus of a fifth embodiment according to the present invention. In FIG. 7, the same reference numbers are attached to the same constituents, and description will be omitted.

In the first embodiment, the directivity has been formed to only one certain utterer uttering the keyword. On the other hand, in the fifth embodiment, the directivity can be formed to a plurality of certain utterers uttering the keyword.

In the fifth embodiment, a plurality of directional controllers 203_1-203_N are provided, different from the first embodiment. The directional controllers 203_1-203_N have the same configurations as those of the first embodiment. The arrival direction setting signals are given from the directional detector 201, respectively, and the directivity of the input sound is set independently based on the inputted arrival direction setting signal.

Next, operations of the fifth embodiment will be described. It is assumed that a first utterer among a plurality of utterers utters the keyword indicating the start of utterance. The recognition unit 300 detects the keyword and indicates the directional determination period to the directional detector 201. Therefore, the directional detector 201 reads out the directional data for a period corresponding to the directional determination period, and detects the direction of arrival of the objective sound by the first utterer (hereinafter, a first certain utterer) uttering the keyword. The arrival direction setting signal indicating the direction of arrival is, for example, provided to the directional controller 203_1. Therefore, the directional controller 203_1 forms the directivity having narrow directivity to the direction of the first certain utterer. In such a way, the processing sound from the directional controller 203_1 becomes a sound which emphasizes the voice uttered by the first certain utterer.

At this time, it is assumed that a second utterer utters the keyword indicating the start of utterance. The recognition unit 300 detects the keyword and indicates the directional determination period to the directional detector 201. Similarly even in this case, the directional detector 201 reads out the directional data for a period corresponding to the directional determination period, and detects the direction of arrival of the objective sound from the second utterer (hereinafter, a second certain utterer) who has read out the directional data for a period corresponding to the directional determination period, and has uttered the keyword). In this case, the directional detector 201 supplies the arrival direction setting signal indicating the direction of arrival, for example, to the directional controller 203_2. Therefore, the directional controller 203_2 forms directivity having narrow directivity to the direction of the second certain utterer. In such a way, the processing sound from the directional controller 203_2 becomes a sound which emphasizes the voice uttered by the second certain utterers.

As described above, according to the fifth embodiment, because a plurality of directional controllers are provided, it is possible to form the directivity at the same time to the direction of a plurality of certain utterers, and to perform voice recognition for the voice uttered by a plurality of certain utterers at high accuracy.

Incidentally, according to the fifth embodiment, because a plurality of directional controllers has to be provided, size of the apparatus increases. Accordingly, the directivity may be sequentially switched by one directional controller. For example, the directional detector 201 supplies the arrival direction setting signal based on the detected direction of arrival to the directional controller when the direction of arrival is detected by the detection of the keyword, after prior directional controlling processing is finished. Therefore, after the directional control processing for the direction of one certain utterer is finished, the directional controlling processing for a direction of a next certain utterer is performed. Because of this, it is possible to improve processing accuracy of voice recognition of certain utterers, without increasing the amount of calculation.

Sixth Embodiment

Figure 8:
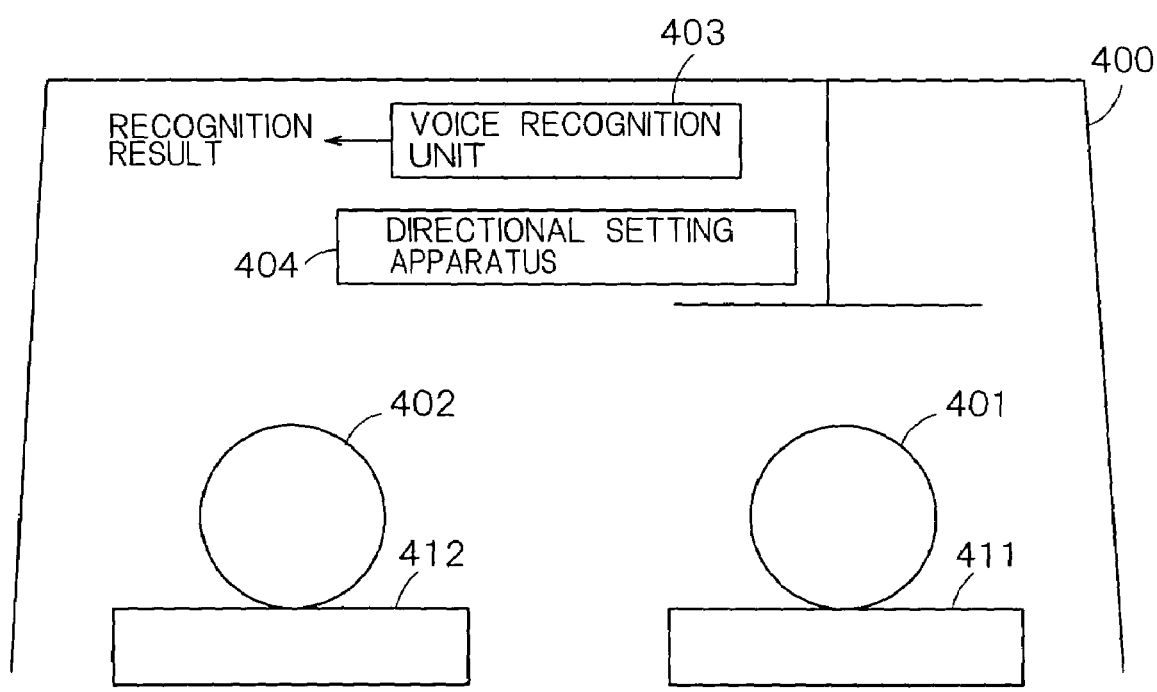
FIG. 8 is a diagram for explaining operation of a sixth embodiment.

FIG. 8 is a diagram for explaining a sixth embodiment according to the present invention. In the sixth embodiment, a directional setting apparatus is applicable to control of a car equipment.

In FIG. 8, a driver seat 411 and an assistant driver seat 412 are provided in the car 400. The driver 401 and the passenger 402 are sitting to the driver seat 411 and the assistant driver seat 412, respectively. The car equipments not shown such as a controller of air conditioner are attached at front side of the car 400 such as a dashboard not shown. Operation of the car equipments is controlled in accordance with the recognition result of the voice recognition unit 403.

The processing sound of the directional setting apparatus of the first, third and fifth embodiments, for example, the processing sound of the directional design apparatus 404 of the third embodiment is supplied to the voice recognition unit 403.

Figure 9:
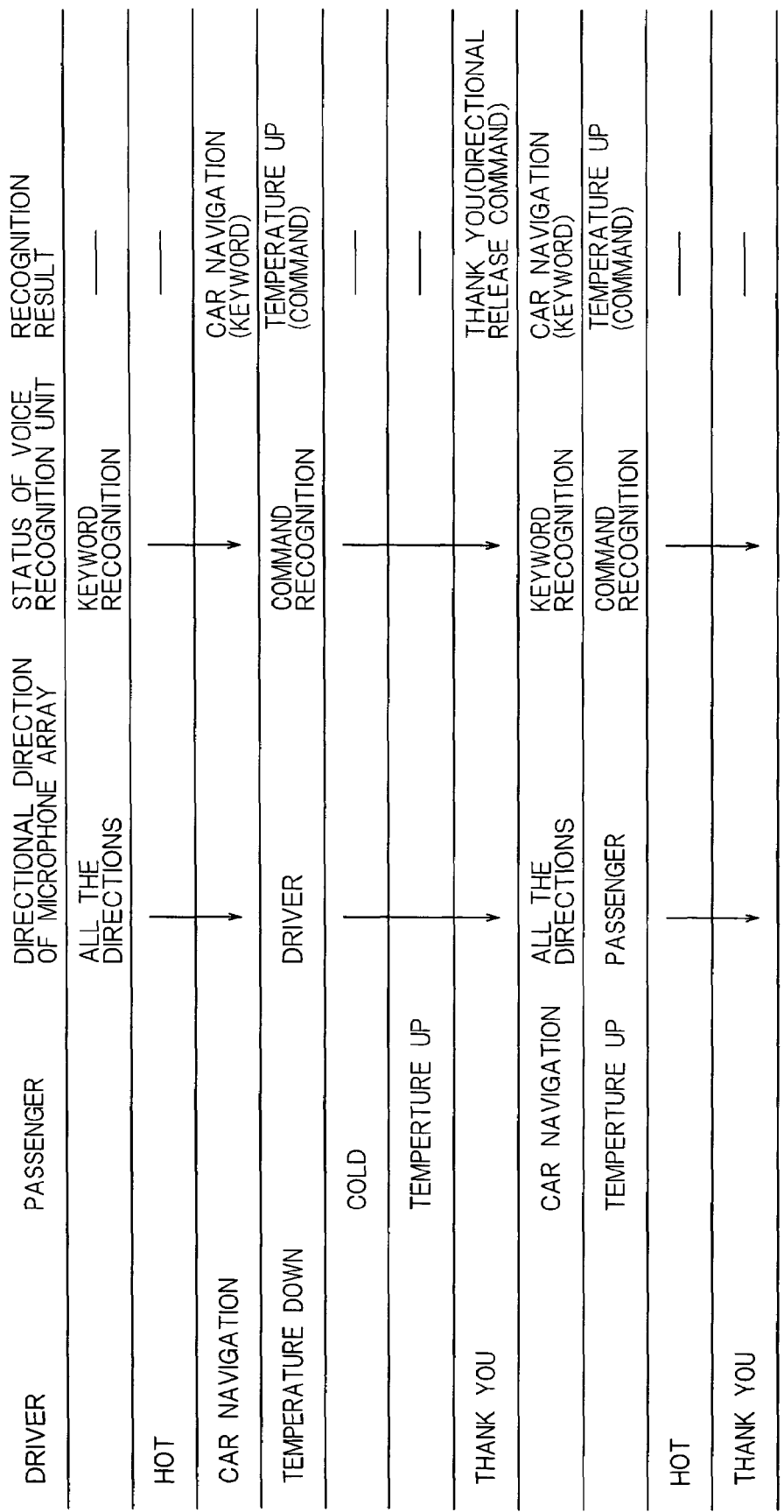
FIG. 9 is a diagram for explaining processing of the sixth embodiment.

Next, operation of the sixth embodiment will be described with reference to FIG. 9. FIG. 9 is a diagram for explaining the processings of the sixth embodiment. FIG. 9 shows sequential conversation between the driver 401 and the passenger 402, and operations of the directional setting apparatus 404 and the voice recognition unit 403 corresponding to the conversation (including the recognition unit in the directional setting apparatus 404 of FIG. 9) in time sequence. In FIG. 9, "-" indicates the status of non-recognition.

The directional setting apparatus 404 registers "car navigation" as the keyword indicating the start of utterance, and "thank you" as the keyword indicating the end of utterance (a directional release command in FIG. 9).

In the initial status, the directional setting apparatus 404 is set to the directivity in all directions (non-directivity), and the voice recognition unit 403 becomes the status which receives the keyword of the start of utterance from the driver 401 and the passenger 402.

Here, it is assumed that the driver 401 utters "hot". This utterance is supplied to the recognition unit 300 without being suppressed via the microphone array (microphones 101_1-101_N shown in FIG. 4) set to all the directions in the directional setting apparatus 404. The recognition unit 300 checks the uttered phrase "hot" with the keyword "car navigation". Because the phrase "hot" does not coincide with the keyword, the result of the voice recognition is rejected in the recognition unit 300.

Next, it is assumed that the driver 401 utters "car navigation". This utterance is provided to the recognition unit 300 via the microphone array having the directivity of all the directions. The recognition unit 300 sets the directional determination period based on the uttered period and indicates the detection of directivity to the directional detector 201, when detected that the "car navigation" uttered by the driver 401 is the keyword indicating the start of utterance.

The directional detector 201 detects the direction of the driver 401 as the direction of arrival of the objective sound by using the directional data stored in the directional storage 202. The directional controller 203 forms narrow directivity to the direction of the driver 401 based on the arrival direction setting signal from the directional detector 201. Afterward, the sound from the direction of the driver 401 is emphasized, and the sound is provided to the voice recognition unit 403 from the directional setting apparatus 404.

Here, it is assumed that the driver 401 utters "temperature down". The sound from the direction of the driver 401 is supplied to the voice recognition unit 403 as the processing sound of an emphasized high quality. The voice recognition unit 403 perform exactly voice recognition for "temperature down" uttered by the driver 401. The result of voice recognition is transferred to the car equipments not shown, and various processings are executed in the car equipments. For example, in this case, the selection temperature of the air conditioner as the car equipments is lowered.

Next, it is assumed that the passenger 402 utters "cold" after the temperature of the car 400 has been lowered. However, at this time, the directivity of the microphone is set to narrow directivity for the driver 401, and voice of the passenger 402 is sufficiently suppressed, and provided to the voice recognition unit 403. In this case, because the processing sound "cold" is sufficiently suppressed, the voice recognition unit 403 does not perform the voice recognition of the phrase "cold". Because of this, control based on the phrase "cold" is not carried out in the car equipments.

Furthermore, similarly, even when the passenger 402 uttered "temperature up" indicating a command to rise the temperature, narrow directivity is set to the driver 401, and the voice of the passenger 402 is sufficiently suppressed, and supplied to the voice recognition unit 403. Accordingly, even in this case, operation of the car equipment is not controlled in accordance with voice of the passenger 402.

Next, it is assumed that the driver 401 utters a command for releasing the directivity "thank you". In this case, the recognition unit 300 in the directional setting apparatus 404 returns the directivity of the directional controller 203 to all the direction. Therefore, the recognition unit 300 is returned to a status of accepting the keyword from all the directions.

Here, it is assumed that the passenger 402 utters "car navigation". In this case, the directivity of the microphone array is set to the passenger 402. The voice recognition unit 403 becomes the status accepting the commands for the passenger 402. When the passenger 402 utters the command "temperature up", the voice from the passenger 402 is emphasized by the directional setting apparatus 404, and supplied to the voice recognition unit 403. Therefore, the air conditioner of the car equipments is controlled and the temperature is raised.

In this case, even if the driver 401 has uttered "hot", because narrow directivity for the direction of the passenger 402 is set, the command "hot" from the driver 401 is not transmitted to the voice recognition unit 403. Similarly, the processing sound in which the directivity is formed is supplied to the recognition unit 300. Because of this, even if the driver 401 has uttered the command "thank you" for releasing the directivity, the microphone array suppresses the utterance and the utterance is not transmitted to the voice recognition unit 403. Accordingly, it is impossible to deprive authority of the utterance of the passenger 402.

As described above, according to the sixth embodiment, because the directivity of the microphone array is set to the person who has uttered the keyword of the start of utterance, it is possible to suppress not only a surrounding noise, but also speaking voices of the passenger, thereby exactly transmitting only the voice of a certain utterer.

By setting the keyword which releases the directivity formed once ("thank you" in the present embodiment), it is possible to move authority of utterance to another person at an arbitrary timing.

In the case of adopting the directional setting apparatus of the first embodiment according to FIG. 1, for example, when narrow directivity is formed to the driver 401, without using the keyword for releasing the directivity, the directional controlling processing may be performed for a new passenger by using the keyword of the start of utterance from the passenger 402.

It is possible to individually form the directivity to the direction of the utterer which has uttered the keyword of the start of the utterance. Therefore, it is possible to separate the voice of the driver 401 from the voice of the passenger 402, and to transmit the voices to the voice recognition unit 403. In this case, when the simultaneous processing is difficult at a side of the car equipments, for example, if narrow directivity is formed to the driver 401, arbitration such as selecting which directions by suspending or querying the processing for the driver 401 based on the keyword of the start of utterance of the passenger 402, becomes necessary.

In the above-mentioned embodiment, an example in which the recognition unit and the voice recognition apparatus in the directional setting apparatus are separate from each other has been described. It is apparent that a recognition engine of the voice recognition apparatus can be used as the recognition unit in the directional setting apparatus.

At least portion of the directional setting system or the directional setting apparatus described in the above-mentioned embodiments may be composed of a hardware or a software. In the case of being composed of the software, a program for realizing at least portion of functions of the directional setting system or the directional setting apparatus may be contained in a recording media such as a flexible disc or CD-ROM, and the program may be read in a computer and executed by the computer. The recording media is not limited to a portable apparatus such as a magnetic disc or an optical disc, and may be a fixed type recording media such as a hard disc drive or a memory device.

Furthermore, a program which realizes at least portion of functions of the directional setting system or the directional setting apparatus may be distributed via a communication line such as an Internet (including wireless communication). The program may be distributed at a encoded, modulated and compressed status, via a wired line or a wireless line such as Internet, or while containing in the recording media.

What is claimed is:

1. A directional selling apparatus, comprising:
    a microphone array having a plurality of microphones, each microphone importing an input sound;
    a voice recognition unit configured to detect a certain keyword included in a sound signal based on the input sound and set a directional determination period based on an occurrence time of a sound signal corresponding to the certain keyword;
    a directivity detector configured to detect a direction of the input sound in the directional determination period and output the detected result; and
    a directivity setting unit configured to set a directivity of a prescribed apparatus based on the detected result of the directivity detector,
    wherein the voice recognition unit recognizes a keyword different from the certain keyword for releasing the directivity set by the directivity selling unit and outputs a directivity release signal; and
    the directivity setting unit releases the directivity of the prescribed apparatus when the directivity release signal is supplied from the voice recognition unit.

2. The directional setting apparatus according to claim 1, wherein the directivity setting unit stores the detected result of the directivity detector when the detected result is given before the directivity release signal is inputted, and sets the directivity of the prescribed apparatus based on the detected result of the directivity detector store after the directivity release signal is inputted.

3. A directional setting apparatus, comprising:
    a microphone array having a plurality of microphones, each microphone importing an input sound;
    a voice recognition unit configured to detect a certain keyword included in a sound signal based on the input sound and set a directional determination period based on an occurrence time of a sound signal corresponding to the certain keyword;
    a directivity detector configured to detect a direction of the input sound in the directional determination period and output the detected result; and
    a directivity setting unit configured to set a directivity of a prescribed apparatus based on the detected result of the directivity detector,
    wherein the directivity detector repeats the detection of the input sound multiple times, supplies the voice recognition unit with the output of the microphone array having the directivity set by the directivity setting unit based on a first detection result of the direction of the input sound, and conducts the subsequent detection of the direction of the input sound by using a sound other than the certain keyword.

4. The directional setting apparatus according to claim 3, wherein the directivity setting unit sets a direction of image pick-up in a camera.

* * * * *